Nov. 3, 1942.    B. B. KAHN ET AL    2,300,551
STOVE
Original Filed June 20, 1938
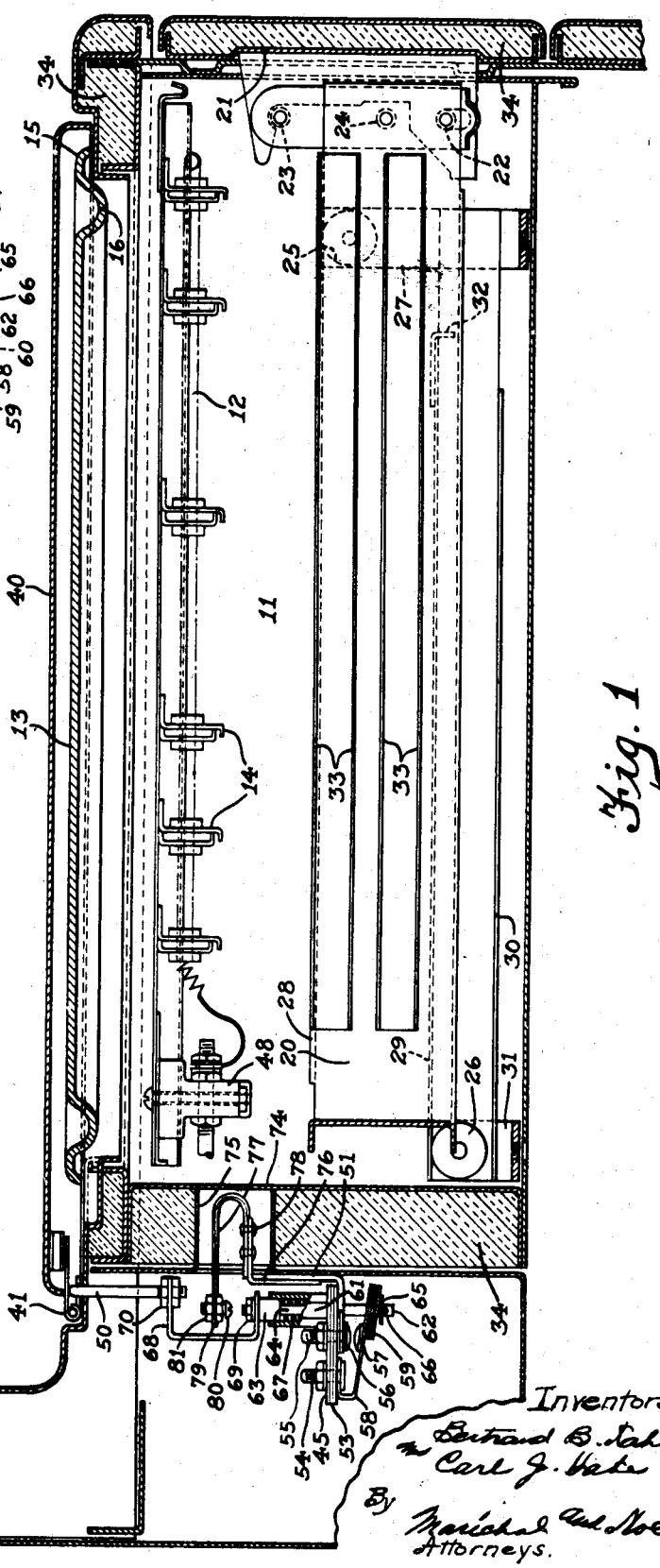
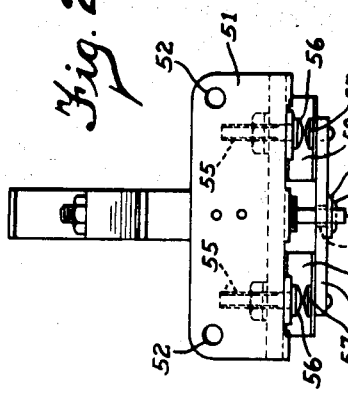
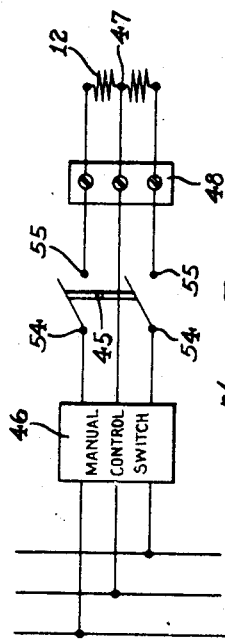
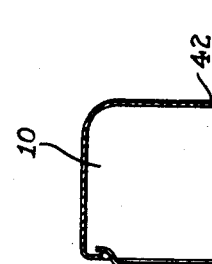
Inventors
Bertrand B. Kahn
Carl J. Hate
By Marshall and Noe
Attorneys.

Patented Nov. 3, 1942

2,300,551

UNITED STATES PATENT OFFICE 2,300,551

STOVE

Bertrand B. Kahn, Cincinnati, and Carl J. Hake, Hamilton, Ohio, assignors to The Estate Stove Company, Hamilton, Ohio, a corporation of Ohio Original application June 20, 1938, Serial No. 214,700. Divided and this application July 29, 1940, Serial No. 348,272

5 Claims. (Cl. 200—138)

This invention relates to stoves and more particularly to a cooking range.

A primary object of the invention is to provide a cooking range having a cooking griddle upon the cooking top of the stove with a coverlid adapted to be moved into and away from a concealing position overlying the griddle and protected so that the heating unit cannot be operated when the cover is in lowered position.

It is a further object to provide a stove having a broiler compartment and an automatically acting control for limiting the maximum temperature condition within the compartment and preventing overheating thereof.

It is a further object to provide a stove having an upper exposed cooking griddle and a broiler compartment both heated from the same source with a cover adapted to overlie the cooking griddle and in which the heating source is turned off either when the cover is lowered or when the temperature within the compartment exceeds a desired maximum.

It is a still further object to provide in a stove of this character a single cut-off means arranged to be actuated in response to both the lowering of said cover and the existence of a temperature within the compartment in excess of the desired maximum to deenergize the heating element.

Other objects and advantages will be apparent from the following description, the appended claims, and the accompanying drawing, in which—

Fig. 1 is a sectional view, partly in elevation, through the broiler compartment and griddle plate of an electric range constructed in accordance with the present invention;

Fig. 2 is a front elevation of the switch means illustrated in Fig. 1; and

Fig. 3 is a diagrammatic view of the control circuit for the combined broiler and griddle plate heating unit.

This application is a division of copending application Serial No. 214,700, filed June 20, 1938 now Patent No. 2,221,870, granted November 19, 1940.

Referring to the drawing which illustrates a preferred embodiment of the invention in which like reference characters designate like parts in the several views, the stove 10, only a portion of which is illustrated, is shown as comprising a broiler compartment 11 having an electrical heating unit 12 in the upper portion thereof and a removable griddle plate 13 positioned above the broiler compartment adjacent the heating unit therein. The heating unit is supported from the framework of the stove by any desired means such as the insulated hangers 14 and an opening is provided in the top of the stove over the broiler compartment to permit the griddle plate to be heated by direct radiation from the heating unit 12. The griddle plate is provided with a marginal downturned flange 15 which rests on the top of the stove structure adjacent the cooking top portion of the stove, not shown, of which it forms in effect a continuation, and is provided with a marginal depression or groove 16 which serves to trap grease or the like and to position the griddle within the opening provided above the broiler compartment. The same heating element thus provides for heating both the broiler compartment and the griddle.

The broiler compartment is provided with a drawer-like member 20 and a front closure 21 which is pivotally connected to the member 20 at the front portion of the stove as indicated at 22. The front closure 21 is normally latched in a vertical position as indicated at 23 but may be swung to a horizontal position by lifting upwardly on the closure and releasing the latch from a pin 23 carried by the member 20 adjacent the forward end thereof. A stop pin 24 limits rotation of the front closure about the pivot 22. The member 20 is adapted to slide into and out of the compartment 11 by means of a handle, not shown, attached to the front closure 21 and is guided in such movement by the rollers 25 and 26. The rollers 25 are supported from the bottom of the broiler compartment by means of a bracket 27 and is adapted to ride on outturned flanges 28 provided on each side of the member 20 at the top portion thereof. The rollers 26 are carried by the member 20 at the lower rear portion thereof and ride within the upper and lower tracks 29 and 30 supported adjacent each side of the broiler compartment by means of the brackets 31 and 27. Stops 32 carried by the upper tracks 29 adjacent the front portion of the broiler compartment normally prevent complete withdrawal of the drawer member 20. The upper tracks 29 and stops 32, however, extend a greater distance towards the front of the compartment than do the lower tracks 30 so that by tilting the drawer member 20 the rollers 26 may be disengaged from the stop members and the drawer member completely withdrawn. The side walls of the drawer member 20 are provided with the ribs 33 or the like for supporting a broiler pan at various distances from the heating unit. Suitable insulating material 34 such as rock wool or the like is provided on all sides of the broiler compartment except at the opening below the griddle plate 13. The construction of broiler drawer shown is for illustrative purposes and other suitable broiler supporting means may also be used.

A coverlid 40 is hingedly mounted on the frame structure of the stove as indicated at 41 and is adapted in its closed position to overlie and conceal the griddle plate 13. The coverlid 40 preferably comprises a continuous suitably decorated metal sheet, and serves to give the stove a neat and attractive appearance and to keep the surface of the griddle clean when not in use. When it is desired to use the griddle plate or the broiler the coverlid is swung to a substantially vertical position where it rests against the mantel back 42 of the stove.

In order to prevent energization of the heating unit 12 when the coverlid 40 is in a closed position with resulting damage to the cover, the stove is provided with a cut-out switch which effects the opening of the circuit to the heating unit when the lid is in a closed position and permits the circuit to be closed when the lid is raised to its open position. As will be evident from the circuit diagram of Fig. 3 the switch means 45 is in addition to the manual control switch 46 which latter is provided to control operation of the heating unit as desired. The heating unit 12 is illustrated as being connected to a conventional, three-wire supply system and is provided with a central tap 47 adapted to be connected to the central or neutral wire of the power system. The switch 45 is connected in the control circuit for the heating unit between the terminal block 48 of the unit and the manual control switch 46 and when operated to its open position breaks the circuit in the two outside wires to prevent energization of the heating unit even though the manual control switch 46 is operated to an on position.

The switch 45 is mechanically operated to its open position by movement of the coverlid 40 to the closed position and is mechanically held open as long as the coverlid remains in such closed position. For this purpose the switch is positioned in an enclosed location at the rear of the broiler compartment away from the direct heat of the compartment and is provided with a pin 50 which projects upwardly through an aperture in the top plate of the stove in position to be operatively engaged by the portion of the hinge member 41 which is attached to the coverlid when the lid is swung to its closed position. The switch is mounted on the rear wall of the broiler compartment by means of a bracket 51 provided with opening 52 adapted to receive a bolt or the like and secure the bracket to the stove wall. A contact assembly plate 53 of suitable insulating material is carried by the bracket at substantially right angles to the rear wall of the broiler compartment and carries two pairs of binding posts 54 and 55 or the like and two pairs of cooperating contact points 56 and 57. As shown in Fig. 3 the binding posts 54 are adapted to be connected to the two outside wires of the control circuit which lead to the manual control switch and the power lines, and the binding posts 55 are connected to the terminal block 48 of the heating unit.

The binding posts 55 extend to the underside of the contact assembly plate 53 and carry the fixed contact points 56 in electrical contact therewith. The binding posts 54 also extend to the underside of the plate 53 and clamp a pair of resilient spring members 58 to the underside of the plate. The spring members 58 carry the movable contacts 57 in cooperating relation to the fixed contacts 56 and are in electrical contact with the respective binding posts 54. The spring members 58 are so constructed as to normally tend to open the contacts 56—57 and provide a spacing therebetween. In order to effect a closing of the contacts the free ends of the two spring members 58 are fastened to a cross bar 59 which is made of suitable insulating material and is provided with an aperture 60 intermediate the two spring members. A plunger housing 61 is carried by the plate 53 in alignment with the aperture 60 and extends upwardly from the plate. The housing 61 is suitable recessed to slidably receive an operating plunger 62 provided with an enlarged head 63 and a lower portion of reduced diameter 64 which passes downwardly through the plate 53 and the aperture 60 of the cross bar 59. The plunger 62 passes freely through the aperture 60 and is provided below the cross bar 59 with suitable means such as the washer 65 and cotter pin 66 to cause lifting of the bar 59 and simultaneous closing of the contacts 56—57 upon upward movement of the plunger.

A spring 67 seated within the recessed portion of the plunger housing 61 engages the enlarged head 63 of the plunger 62 and urges the plunger upwardly to cause lifting of the cross bar 59 and closing of the contacts 56—57. The spring 67 is of sufficient strength to lift the plunger 62 and cross bar 59 into the contact closing position against the action of the spring members 58 which tend to cause opening of the contacts. Thus the contacts 56—57 are normally maintained closed by the spring 67. When, however, the plunger 62 is mechanically depressed against the action of the spring 67, the cross bar 59 can move to a lower position and the spring members 58 cause the contacts to open. Upon release of the mechanical pressure upon the plunger the spring 67 causes the contacts to move to the closed position.

The operating plunger 62 is adapted to be mechanically depressed by means of the operating pin 50 which extends upwardly through the stove top and is engaged by the coverlid when the coverlid is moved to its closed position. For this purpose the lower end of the operating pin 50 and the upper end of the plunger 62 are connected together by means of a rigid substantially U-shaped bracket 68 having the lower arm thereof attached to the plunger 62 by suitable means such as the nut 69 and the upper arm attached to the pin 50 by means of nuts 70 which thread on the lower portion of the pin 50 and clamp the pin to the bracket. The nuts 70 provide an attachment which permits vertical adjustment of the operating pin 50. When the coverlid is in the raised position the spring 67 which lifts the plunger 62 and causes the contacts 56—57 to close also raises the operating pin 50 into a position above the top of the stove in which it will be engaged and depressed by the coverlid upon closing movement thereof. Depression of the pin 50 by the coverlid causes the plunger 62 to be mechanically depressed against the action of spring 67 to open the contacts 56—57. It will thus be evident that whenever the coverlid is in the closed position the contacts 56—57 of switch means 45 will be open and prevent energization of the heating unit whereas raising of the coverlid causes closing of the contacts and permits operation of the heating unit under control of the manual switch 46.

Not only is it desired to provide against such operation of the heating unit as to cause damage to the coverlid, but it is also desired to prevent such operation as to cause damage to the broiler compartment and other parts of the stove by development of an abnormally high temperature condition therein. Where cooking operations are being conducted either on the griddle or within the broiler compartment, such operations absorb heat and are normally completed in a relatively brief period of time such that no damaging temperature condition is developed in the compartment. However when no cooking is in progress or when foodstuff is allowed to remain in the heating zone for an excessively long period of time, the temperature therein may raise to such degree as to cause damage. In accordance with the invention the switch means 45 is also provided with a means for opening the contacts 56—57 to cause deenergization of the heating unit in the event that the temperature within the broiler compartment becomes excessively high. For this purpose the insulation 34 adjacent the rear wall 74 of the broiler compartment is provided with a recess or well 75, and a heat responsive device adapted to mechanically depress the plunger 62 is mounted within this well and though spaced from the interior of the broiler compartment is in heat transfer relationship therewith, the wall 74 of the well providing a thermal lag in the response which the temperature sensitive element makes to the temperature within the broiler. This thermal lag is desirable to avoid premature deenergization of the heating element during the normal course of a cooking operation while providing for proper response of the thermal sensitive device to an abnormal temperature condition continuing for such period of time as to be damaging.

Referring to the drawing an angle bracket 76 is rigidly attached to the bracket 51 and extends into the interior of the well 75. A bimetallic strip 77 is rigidly connected at one end to the bracket 76 by suitable means such as the rivet 78 and has its free end 79 overlying the upper end of the plunger 62. The bimetallic strip 77 is of such character as to cause its free end 79 to move downwardly upon heating of the strip and upwardly upon cooling thereof. A calibrating screw 80 is attached to the end 79 of the bimetallic strip by means of nuts 81 and is adapted to engage the upper end of the plunger 62 and depress the plunger upon a predetermined downward movement of the free end of the bimetallic strip. The screw 80 and the upper end of the plunger 62 are normally spaced apart by a distance sufficient to permit operation of the broiler within the desired normal temperature range without any contact being made between the screw and the plunger. When, however, the temperature of the broiler compartment rises above a predetermined limit, of the order of 650° F. for example, the screw 80 engages the top of the plunger 62 and any further rise in temperature of the broiler compartment will cause the bimetallic strip to depress the plunger, thereby opening the contacts 56—57 and causing deenergization of the heating unit. Upon cooling of the broiler compartment below this desired maximum value following deenergization of the heating unit the end 79 of the bimetallic strip will rise and when the temperature has fallen a suitable amount, of the order of 50° F. for example, the contacts 56—57 will again close and permit energization of the heating unit. Thus when the coverlid 40 is in the open position and the manual control switch 46 is moved to an on position to energize the heating unit 12 the bimetallic strip 77 provides a means for automatically opening the circuit to the heating element when the temperature of the broiler compartment rises above a desired predetermined limit and for automatically closing the circuit when the temperature falls below this limit. By adjusting the vertical position of the screw 80 the normal spacing between the screw and the top of the plunger 62 may be varied to control and select the predetermined temperature limit at which the bimetallic strip operates to deenergize the heating unit.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A switch mechanism of the character described comprising a base, fixed contacts mounted on said base, a plurality of movable contacts cooperating respectively with said fixed contacts, yieldable means for mounting said movable contacts for normal movement away from said fixed contacts, an operating member adapted to cause the movement of said movable contacts into circuit closed relation with said fixed contacts, resilient means associated with said operating member and adapted to effect movement thereof to cause operation of said contacts to closed circuit position, a temperature responsive element, and means for effecting movement of said operating member in the opposite direction under the action of said temperature responsive element.

2. A switch mechanism of the character described comprising a base, fixed contacts mounted on said base, a plurality of movable contacts cooperating respectively with said fixed contacts, yieldable means for mounting said movable contacts for normal movement away from said fixed contacts, an operating member adapted to cause the movement of said movable contacts into circuit closed relation with said fixed contacts, resilient means associated with said operating member and adapted to effect movement thereof to cause operation of said contacts to closed circuit position, a temperature responsive element normally out of contact with said operating member and adapted to engage said member in a predetermined position to effect movement thereof to cause opening of said switch contacts.

3. A switch mechanism of the character described comprising a base, fixed contacts mounted on said base, a plurality of movable contacts cooperating respectively with said fixed contacts, flexible means for mounting said movable contacts upon said base and normally urging the same to open circuit position, an operating member adapted to engage said movable contacts to cause closing thereof upon said fixed contacts in one direction of movement and freely movable with respect to said movable contacts in the opposite direction, resilient means for effecting movement of said operating member in said one direction to effect the closing of said contacts, and additional means operable for moving said operating member in the opposite direction to provide for the opening of said contacts while over-travel of said operating member is permitted in said opposite direction.

4. A switch mechanism of the character described comprising a base, fixed contacts mounted on said base, a plurality of movable contacts, flexible means for mounting said movable contacts upon said base and normally urging the same to open circuit position, an operating member adapted to engage said contacts to cause closing thereof upon said fixed contacts in one direction of movement and freely movable with respect to said movable contacts in the opposite direction, resilient means for overcoming the action of said flexible means and effecting movement of said operating member in said one direction to effect the closing of said contacts, and temperature responsive means adapted to engage said operating member to effect movement thereof in the opposite direction to provide for opening of said switch contacts while permitting over-travel of said operating member.

5. A switch mechanism of the character described comprising a base, fixed contacts mounted on said base, a plurality of movable contacts, flexible means for mounting said movable contacts upon said base and normally urging the same to open circuit position, an operating member adapted to engage said contacts to cause closing thereof upon said fixed contacts in one direction of movement and freely movable with respect to said movable contacts in the opposite direction, resilient means for overcoming the action of said flexible means and effecting movement of said operating member in said one direction to effect the closing of said contacts, and a bimetallic thermostatic element normally out of contact with and adapted to engage said operating member under predetermined conditions to effect movement thereof in the opposite direction to provide for opening of said switch contacts while permitting over-travel of said operating member.

BERTRAND B. KAHN.
CARL J. HAKE.